United States Patent
Dechant et al.

(10) Patent No.: US 11,506,749 B2
(45) Date of Patent: Nov. 22, 2022

(54) APPARATUS AND METHOD FOR ADJUSTING A SUPPRESSION SIGNAL FOR SUPPRESSING AN RF INTERFERENCE SIGNAL

(71) Applicant: Infineon Technologies AG, Neubiberg (DE)

(72) Inventors: Martin Dechant, Graz (AT); Stefan Herzinger, Sauerlach (DE)

(73) Assignee: Infineon Technologies AG, Neubiberg (DE)

( * ) Notice: Subject to any disclaimer, the term of this patent is extended or adjusted under 35 U.S.C. 154(b) by 295 days.

(21) Appl. No.: 16/679,701

(22) Filed: Nov. 11, 2019

(65) Prior Publication Data
US 2020/0150218 A1    May 14, 2020

(30) Foreign Application Priority Data
Nov. 13, 2018 (DE) .......................... 102018128334.2

(51) Int. Cl.
    *G01S 7/03*     (2006.01)
(52) U.S. Cl.
    CPC ............... *G01S 7/038* (2013.01); *G01S 7/03* (2013.01)
(58) Field of Classification Search
    CPC .................................. G01S 7/03; G01S 7/038
    See application file for complete search history.

(56) References Cited

U.S. PATENT DOCUMENTS

| | | | |
|---|---|---|---|
| 9,791,551 B1* | 10/2017 | Eshraghi | G01S 7/0232 |
| 2009/0121918 A1* | 5/2009 | Shirai | G01S 7/023 342/159 |
| 2012/0001791 A1* | 1/2012 | Wintermantel | G01S 7/023 342/109 |
| 2012/0326919 A1* | 12/2012 | Himmelstoss | G01S 7/032 342/159 |
| 2017/0168140 A1* | 6/2017 | Hosokawa | H04B 1/525 |
| 2017/0170560 A1* | 6/2017 | Ookawa | G01S 13/93 |
| 2019/0170857 A1* | 6/2019 | Nakajima | G01S 13/931 |

FOREIGN PATENT DOCUMENTS

WO    2018029954 A1    2/2018

* cited by examiner

*Primary Examiner* — Marcus E Windrich
(74) *Attorney, Agent, or Firm* — Harrity & Harrity, LLP

(57) ABSTRACT

The present disclosure relates to adjusting a suppression signal for suppressing a radio frequency (RF) interference signal in a received signal. A method includes generating an RF signal having a first frequency offset from an interference frequency; generating the suppression signal having a second frequency offset from the interference frequency; coupling the suppression signal into the received signal in order to generate a receiver input signal; mixing the receiver input signal with the RF signal in order to generate a mixer output signal; adjusting an amplitude of the suppression signal in order to align amplitudes of different components of the mixer output signal; coupling an adjusted suppression signal, having the interference frequency and the adjusted amplitude, into the received signal; and varying a phase of the adjusted suppression signal in order to reduce a frequency component of the mixer output signal that has the first frequency offset.

17 Claims, 4 Drawing Sheets

APPARATUS AND METHOD FOR ADJUSTING A SUPPRESSION SIGNAL FOR SUPPRESSING AN RF INTERFERENCE SIGNAL

RELATED APPLICATION

This application claims priority to German Application No. 102018128334.2 filed Nov. 13, 2018, which is incorporated herein by reference in its entirety.

FIELD

The present disclosure relates to a design for adjusting a suppression signal for suppressing a radio frequency (RF) interference signal in a received signal. The design can be used for RF receivers and transceivers, for example.

BACKGROUND

In transceivers, such as for example radar transceivers, crosstalk from transmitting to receiving antenna(s) can cause interference signals (what are known as blockers) that are somewhat more powerful than a received signal of interest per se and therefore block the received signal. Especially at high transmission powers in comparison with received signal powers, such as for example in radar applications, this can hamper received signal detection or even render it quite impossible.

There is therefore a need to reduce or even totally obliterate the influence of such interference signals (blockers).

SUMMARY

This need is met by methods and apparatuses in accordance with the independent claims. Advantageous developments are the subject matter of the dependent claims.

In accordance with a first aspect, a method for adjusting a suppression signal for suppressing (rejecting) an RF interference signal having an interference frequency in a received signal is proposed. The method includes: generating an RF signal having a first frequency offset from the interference frequency; generating the suppression signal having a second frequency offset from the interference frequency; coupling or injecting the suppression signal into the received signal in order to generate a receiver input signal; mixing the receiver input signal with the RF signal in order to generate a mixer output signal; adjusting an amplitude of the suppression signal in order to align an amplitude of a first component of the mixer output signal with an amplitude of a second component of the mixer output signal, wherein the first component originates from the suppression signal in the receiver input signal and the second component originates from the interference signal in the receiver input signal; generating an adjusted suppression signal having the interference frequency and the adjusted amplitude; coupling or injecting the adjusted suppression signal into the received signal; and varying a phase of the adjusted suppression signal in order to reduce a frequency component of the mixer output signal that has the first frequency offset.

The coupling of the suppression signal into the received signal upstream of a receiver circuit allows reducing the influences of the interference signal before the receiver circuit. The receiver circuit or reception amplifiers installed therein can therefore be adapted to the power range of the actual received or useful signal and therefore cannot be overwritten by the interference signal or the blocker. In accordance with some exemplary embodiments, the coupling-in of the suppression signal takes place such that the suppression signal is coupled or injected into the received signal on the signal path between a receiving antenna and a reception amplifier, such as for example a low noise amplifier (LNA), at RF level. This allows the interference signal (blocker signal) to be reduced or eliminated by means of destructive superposition with the suppression signal upstream of the LNA.

In accordance with some exemplary embodiments, the interference frequency of the interference signal is known. This is the case for example when the interference frequency corresponds to a frequency of a local oscillator signal that is used not only for a receiver but also for a transmitter of a transceiver and/or when the interference frequency corresponds to a known transmission frequency. This can be the case with radar transceivers, for example.

In accordance with some exemplary embodiments, the RF signal is generated by mixing a local oscillator signal and a first signal with a frequency corresponding to the first frequency offset. Additionally, or alternatively, the suppression signal can be generated by mixing the local oscillator signal and a second signal with a frequency corresponding to the second frequency offset. The local oscillator signal can be an RF signal, for example in the MHz or GHz range, while the first and/or second signal can be a baseband signal at lower frequencies in comparison with the local oscillator signal.

Within the context of the present disclosure, the term "mixing" can cover any method for frequency conversion of a signal from a first frequency range into a second frequency range. There are many different kinds of technical implementations eligible for frequency conversion, such as for example digital and/or analog mixing designs. One from numerous examples is IQ mixers. IQ modulators are also eligible.

In accordance with some exemplary embodiments, the adjusting of the amplitude of the suppression signal is followed by the second frequency offset being set to zero. After the amplitude of the second component has been aligned with the amplitude of the first component of the mixer output signal, the suppression signal is thus generated without a frequency offset, i.e. at the interference frequency, and coupled into the noisy received signal. At this stage, the suppression signal and the interference signal thus have at least approximately the same amplitude and frequency, so that a phase of the suppression signal can subsequently be adjusted for destructive superimposition with the interference signal at RF level.

In accordance with some exemplary embodiments, the varying of the phase of the suppression signal includes determining a phase for which the amplitude of the first component of the mixer output signal becomes minimal or almost minimal in comparison with the amplitude for other phases of the suppression signal. This is the case with destructive superimposition of suppression signal and interference signal, i.e. if the two signals are phase-shifted to at least approximately 180°. The phase of the suppression signal can be found by using known gradient methods, for example.

In accordance with some exemplary embodiments, the mixer output signal can be spectrally decomposed in order to adjust the amplitude and/or phase thereof. This can be implemented efficiently in digital baseband, for example, by means of a fast Fourier transformation (FFT). Other methods of spectral decomposition, such as for example the use of filters, may also be conceivable.

In accordance with a further aspect, in a manner corresponding to the method, an apparatus for adjusting a suppression signal for suppressing an RF interference signal, which has an interference frequency, in a received signal is also provided. The apparatus includes: a first IQ mixer configured to generate an RF signal having a first frequency offset from the interference frequency; a second IQ mixer configured to generate the suppression signal with a second frequency offset from the interference frequency; a coupler configured to couple the suppression signal into the received signal in order to generate a receiver input signal; a receiver circuit configured to mix the receiver input signal with the RF signal in order to generate a mixer output signal; an amplitude compensator configured to adjust an amplitude of the suppression signal in order to align an amplitude of a first component of the mixer output signal with an amplitude of a second component of the mixer output signal, wherein the first component originates from the suppression signal in the receiver input signal and the second component originates from the interference signal in the receiver input signal, wherein the second IQ generator is configured to generate an adjusted suppression signal at the interference frequency and at the adjusted amplitude, wherein the coupler is configured to couple the adjusted suppression signal into the received signal; and a phase compensator configured to vary a phase of the adjusted suppression signal in order to reduce the amplitude of the first component of the mixer output signal.

In accordance with some exemplary embodiments, the device for generating the suppression signal is designed to follow the adjusting or alignment of the amplitude of the suppression signal by setting the second frequency offset to zero.

In accordance with some exemplary embodiments, the device for coupling in the suppression signal is designed to couple the suppression signal into the received signal on a signal path between a receiving antenna and an LNA.

In accordance with some exemplary embodiments, the device for adjusting the amplitude of the suppression signal is designed to spectrally decompose the mixer output signal and to adjust the amplitude and/or the phase of the suppression signal on the basis of the spectrally decomposed mixer output signal.

In accordance with some exemplary embodiments, the device for generating the RF signal is designed to generate the RF signal by IQ-mixing a local oscillator signal and a first baseband signal with a frequency corresponding to the first frequency offset.

In accordance with some exemplary embodiments, the device for generating the suppression signal is designed to generate the suppression signal by IQ-mixing the local oscillator signal and a second baseband signal with a frequency corresponding to the second frequency offset.

A further aspect of the present disclosure is a radar transceiver having such an apparatus for adjusting a suppression signal.

BRIEF DESCRIPTION OF THE DRAWINGS

Some examples of apparatuses and/or methods are explained in more detail merely in exemplary fashion below with reference to the accompanying figures, in which.

DETAILED DESCRIPTION

Various examples will now be described more thoroughly with reference to the accompanying figures, which depict a few examples. In the figures, the thicknesses of lines, layers and/or regions may be exaggerated for clarification purposes.

While further examples are suitable for various modifications and alternative forms, some specific examples thereof are correspondingly shown in the figures and are described thoroughly below. However, this detailed description does not restrict further examples to the specific forms described. Further examples can cover all modifications, counterparts and alternatives that fall within the scope of the disclosure. Throughout the description of the figures, identical or similar reference signs refer to identical or similar elements which can be implemented identically or modified form in a comparison with one another, while they provide the same or a similar function.

It goes without saying that if one element is designated as "connected" or "coupled" to another element, the elements can be connected or coupled directly or via one or more intermediate elements. If two elements A and B are combined using an "or" this should be understood such that all possible combinations are disclosed, i.e. only A, only B, and A and B, unless explicitly or implicitly defined otherwise. An alternative wording for the same combinations is "at least one from A and B" or "A and/or B". The same applies, mutatis mutandis, to combinations of more than two elements.

The terminology used here to describe specific examples is not intended to have a limiting effect for further examples. When a singular form, e.g. "a, an" and "the" is used, and the use of only a single element is defined neither explicitly nor implicitly as obligatory, further examples can also use plural elements in order to implement the same function. If a function is described below as implemented using multiple elements, further examples can implement the same function using a single element or a single processing entity. Furthermore, it goes without saying that the terms "comprises", "comprising", "has" and/or "having" in their usage make more precise the presence of the indicated features, integers, steps, operations, processes, elements, components and/or a group thereof, but do not exclude the presence or addition of one or more other features, integers, steps, operations, processes, elements, components and/or a group thereof.

Unless defined otherwise, all terms (including technical and scientific terms) are used here in their customarily meaning in the field with which examples are associated.

Figure 1:
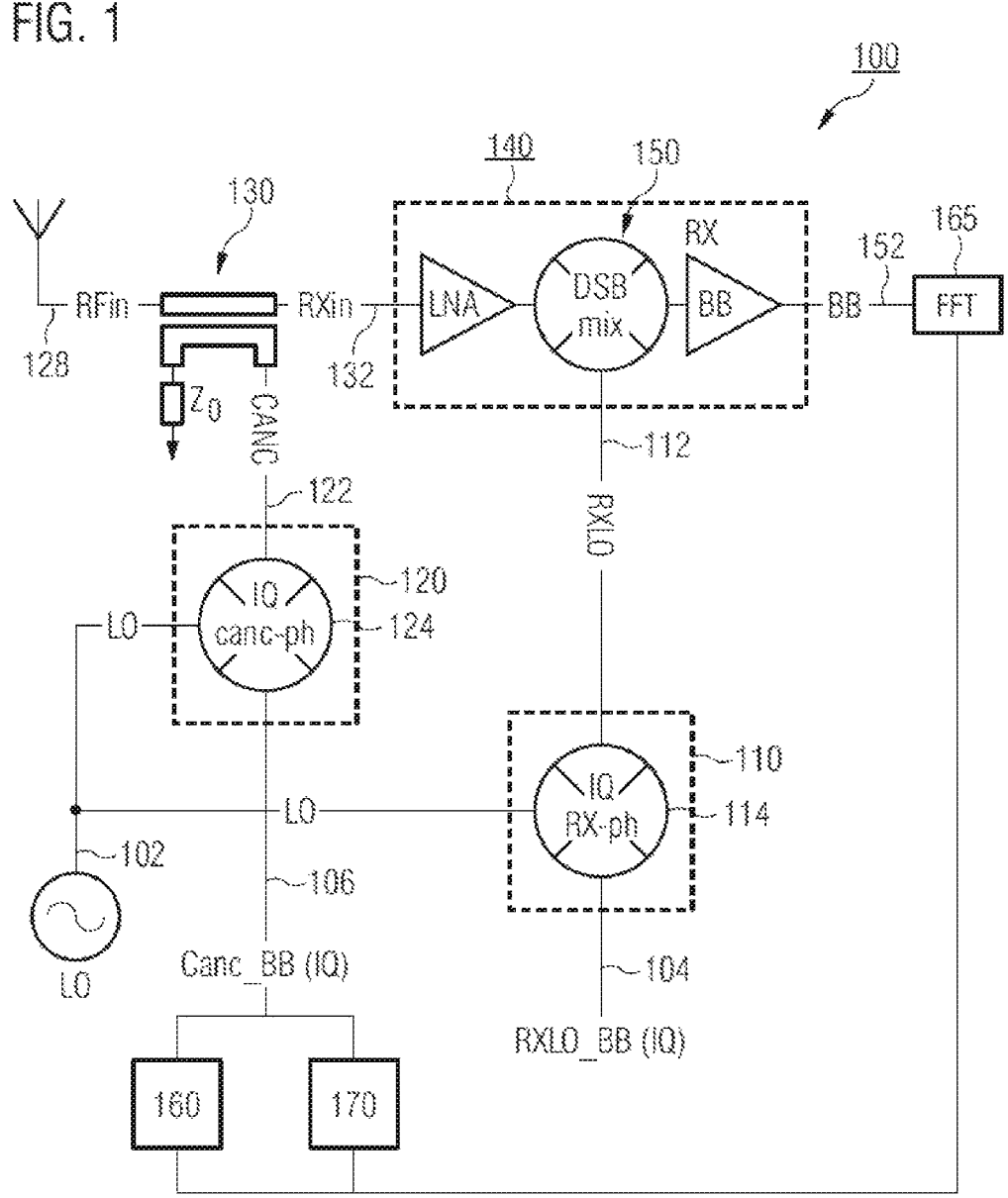
FIG. 1 shows a block diagram of an exemplary embodiment of an apparatus for adjusting a rejection signal for rejecting an RF interference signal.

FIG. 1 shows a block diagram of an exemplary apparatus 100 for adjusting a suppression signal that can be used to suppress or reject an RF interference signal (blocker) having an interference frequency in a received signal. Hence, the suppression signal may also be referred to as a rejection signal and "suppress" and "reject" may be used interchangeably.

The apparatus 100 comprises a device 110 for generating an RF signal 112 that has a frequency having a first frequency offset from the interference frequency. The apparatus 100 further comprises a device 120 for generating the suppression signal 122 at a frequency that has a second frequency offset from the interference frequency. There is also provision for a device 130 for coupling or injecting the suppression signal 122 into the received signal 128 at RF level in order to generate a receiver input signal 132 for a receiver 140. The receiver 140 comprises a device 150 for mixing the (RF) receiver input signal 132 with the RF signal 112 in order to generate a mixer output signal 152.

In the embodiment shown in FIG. 1, the RF signal 112 having the first frequency offset from the interference frequency is generated by mixing a local oscillator signal 102 and a first signal 104 with a frequency corresponding to the first frequency offset. To this end, an IQ mixer 114 is provided in the exemplary embodiment of FIG. 1. An IQ mixer typically comprises two identical mixing stages that are actuated with a signal phase-shifted through 90°. It is also possible to use various other technologies for frequency conversion instead. The first signal 104 may be for example a complex (cosinusoidal and sinusoidal) baseband signal, the frequency of which corresponds to a percentage of the frequency of the local oscillator signal 102, for example 1%, 5%, 10% or 20%. Without restricting the generality, it is assumed that the interference frequency of the interference signal corresponds to the frequency of the local oscillator signal 102, as may be the case for crosstalk from the transmitter to the receiver, for example. The suppression signal 122 is generated in FIG. 1 by mixing the local oscillator signal 102 and a second signal 106 with a frequency corresponding to the second (initially non-zero) frequency offset. To this end, in the exemplary embodiment of FIG. 1, there is provision for a further IQ mixer 124. The second signal 106 can, to this end, likewise be a complex (cosinusoidal and sinusoidal) baseband signal, the frequency of which is different than that of the first signal 104 and initially corresponds to a different percentage of the frequency of the local oscillator signal 102, for example 2%, 3%, 8% or 15%. The signals therefore become spectrally distinguishable. On the basis of the mixer output signal 152, the amplitude and phase of the (RF) suppression signal 122 can be adjusted in order to counteract the interference signal. To this end, the apparatus 100 comprises a device 160 for adjusting the amplitude of the suppression signal 122 in order to align an amplitude of a (first) component of the mixer output signal 152, which (first) component originates from the suppression signal 122 in the receiver input signal 132, with an amplitude of a further (second) component of the mixer output signal 152, which further (second) component originates from the interference signal in the receiver input signal 132. For this purpose, the mixer output signal 152 can be spectrally decomposed in order to obtain different frequency components of the signal. While an FFT 165 is indicated in FIG. 1 for this purpose, the spectral decomposition can also be achieved using other means, such as for example bandpass filters, in other exemplary embodiments. When the amplitude of the first component has been aligned with the amplitude of the second component of the mixer output signal, the suppression signal 122 is generated at the interference frequency and the adjusted or aligned amplitude and coupled into the received signal 128. After the amplitude of the suppression signal 122 is adjusted or aligned, the frequency offset of said suppression signal from the interference frequency is thus set to zero, so that the frequency of the suppression signal 122 corresponds to that of the interference signal or of the local oscillator signal 102. The mixer 124 then merely acts as a phase shifter.

In order to control the phase of the suppression signal 122, there is provision for a device 170 for varying the phase of the suppression signal 122, said device being able to be used to control or adjust the phase such that the amplitude of the interference signal component of the mixer output signal 152 is at least reduced on the basis of destructive superimposition of suppression signal 122 and interference signal. In the event of ideally complete destructive superimposition of suppression signal 122 and interference signal, the mixer output signal 152 should no longer have an interference signal component.

Figure 3:
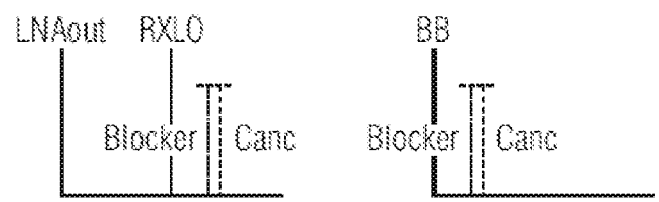
FIG. 3 shows a schematic spectral representation of various signal components.
Figure 4:
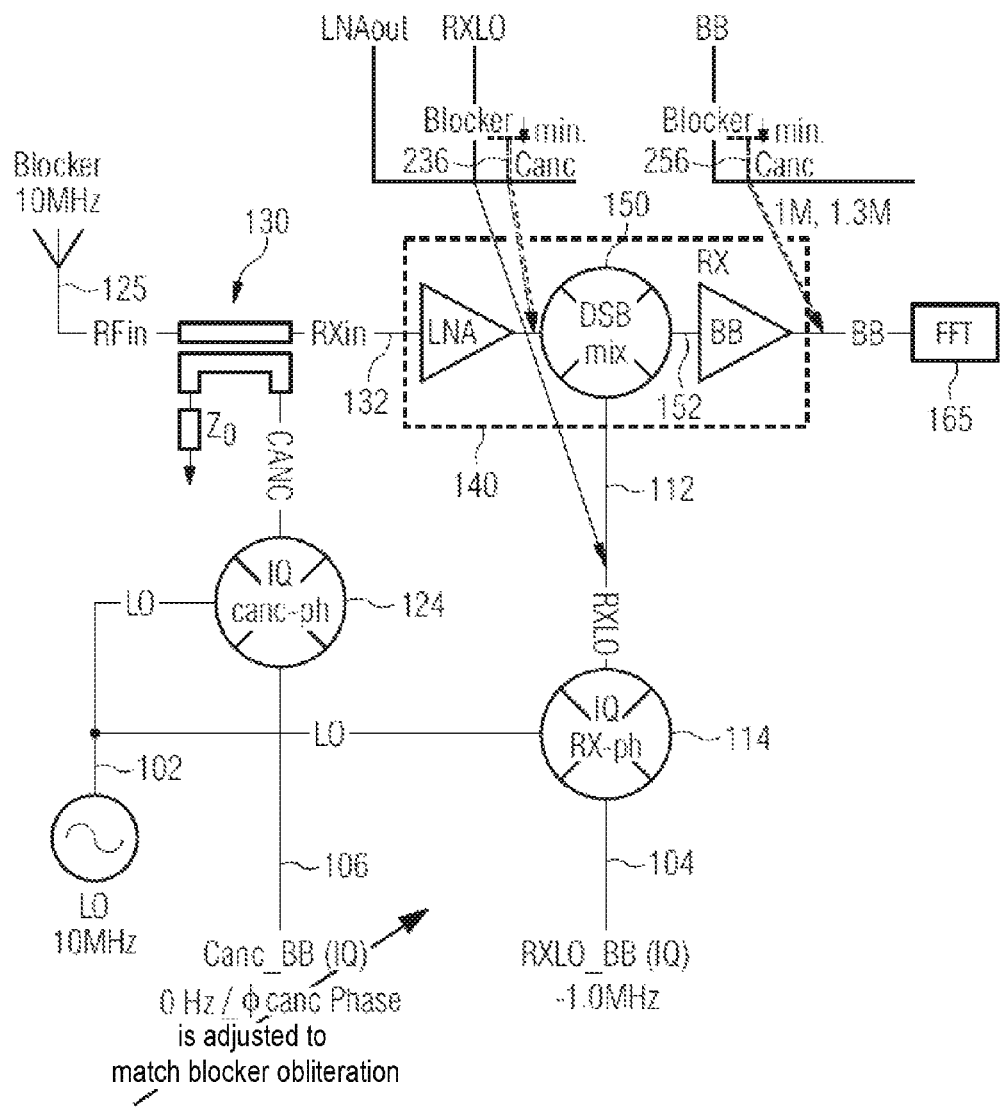
FIG. 4 shows a schematic depiction to explain a phase adjustment of the rejection signal for destructive superimposition with the interference signal.

An exemplary embodiment of the approach for suppressing or rejecting the RF interference signal is explained below using exemplary FIGS. 2-4.

Figure 2:
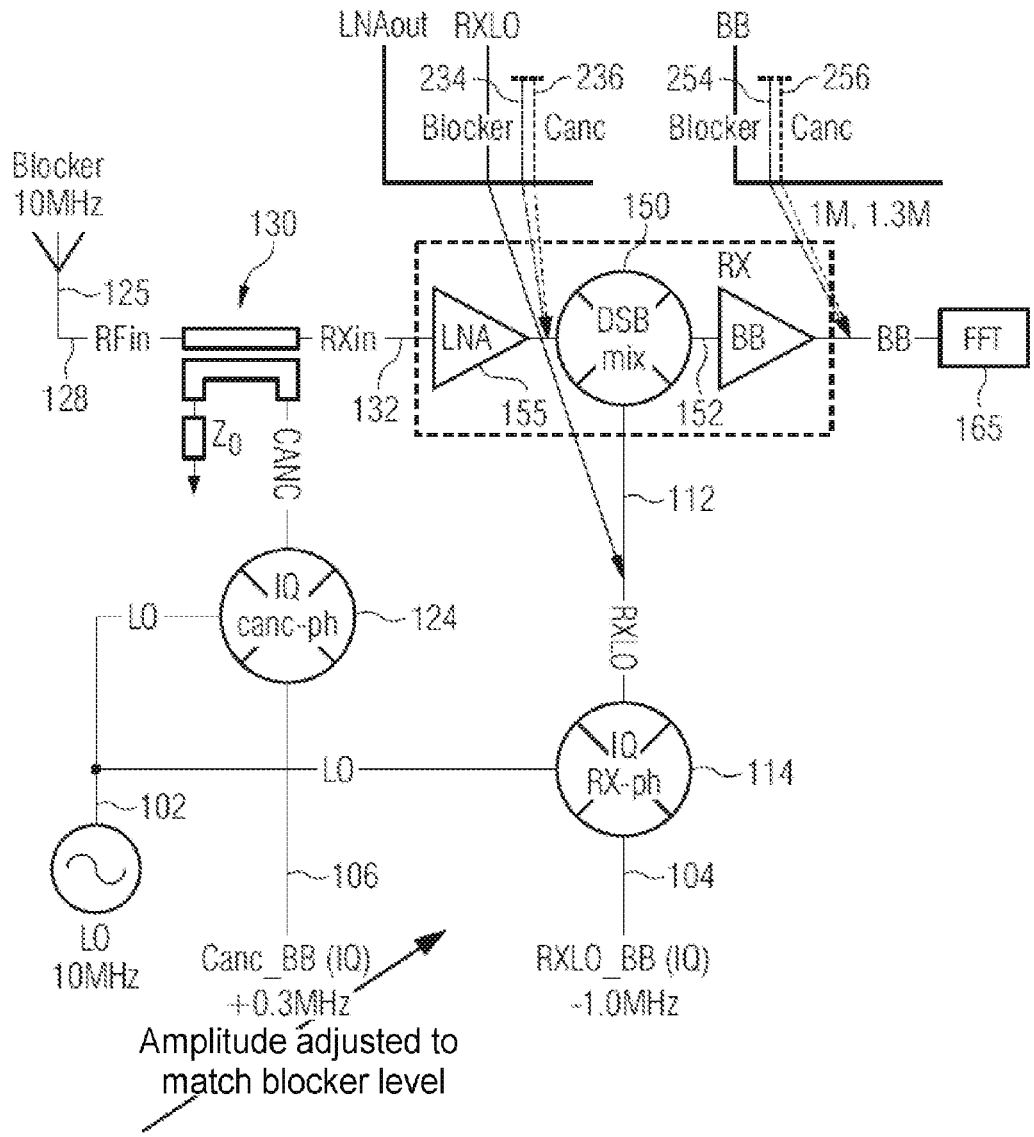
FIG. 2 shows a schematic depiction to explain an amplitude trimming for the rejection signal with the interference signal.

A digital signal generator not depicted in FIG. 2, generates a digital, sinusoidal IQ signal pair (phase-shifted through 90°) having an exemplary frequency $f_{ofs,rxlo}=-1$ MHz and having maximum amplitude as a first signal 104 (RXLO_BB). The frequency $f_{ofs,rxlo}$ corresponds to the first frequency offset. If an exemplary frequency of 10 MHz is assumed for the local oscillator signal 102, a frequency of 9 MHz is obtained for the RF signal 112 (RXLO) resulting from the mixing in the mixer 114. The RF signal 112 is mixed, by means of the mixer 150 in the receiver 140, with a receiver input signal 132 amplified by LNA 155, in order to obtain the mixer output signal 152. The mixer output signal 152 contains a frequency component 254 that originates from the interference signal component 234 in the receiver signal 32 and has a frequency of 10 MHz−9 MHz=1 MHz. This is based on the assumption that the interference frequency of the interference signal corresponds to the local oscillator signal frequency (10 MHz), which is realistic during FMCW radar operation, for example.

A digital signal generator not depicted in FIG. 2, generates a digital, sinusoidal IQ signal pair (phase shifted through 90°) having an exemplary frequency $f_{ofs,canc}=+0.3$ MHz as a second signal 106 (Canc_BB). The frequency $f_{ofs,canc}$ corresponds to the second frequency offset. If an exemplary frequency of 10 MHz is assumed for the local oscillator signal 102, a frequency of 10.3 MHz is obtained for the suppression signal 122 (CANC) resulting from the mixing at 124. The (RF) suppression signal 122 is coupled into the (RF) received signal 128 via coupler 130 between antenna 125 and LNA 155. The resulting receiver input signal 132 is mixed with the RF signal 112 (RXLO) in order to obtain the mixer output signal 152. The latter contains a frequency component 256 that originates from the suppression signal component 236 in the receiver input signal 132 and has a frequency of 10.3 MHz−9 MHz=1.3 MHz.

The two frequency components 254, 256 of the mixer output signal 152 may be ascertained (determined) in digital baseband by means of an FFT block 165. The amplitude of the second signal 106 (Canc_BB) can be adapted on the basis thereof until the amplitude of the frequency component 256 of the suppression signal component corresponds to the amplitude of the frequency component 254 of the interference signal component (see FIG. 3). The adapted or calibrated amplitude (canc_amp) can subsequently be stored for further use.

A further step involves the phase of the second signal 106 (Canc_BB) and hence of the suppression signal 122 (CANC) for suppressing the interference signal being adapted.

The digital signal generator for the first signal 104 (RXLO_BB) continues to generate the latter at the frequency $f_{ofs,rxlo}=-1$ MHz to adjust the phase. The digital signal generator for the second signal 106 (Cane BB) then generates the latter at the calibrated amplitude (canc_amp) and at frequency $f_{ofs,canc}=0$. The second frequency offset is thus zero, therefore. The digital IQ signal pair for Canc_BB then has the following appearance:

$$Canc\_BB\_I=canc\_amp*\cos(canc\_phi) \qquad (1)$$

$$Canc\_BB\_Q=canc\_amp*\sin(canc\_phi) \qquad (2)$$

In this case, "canc_phi" is a variable for a suppression phase that is phase shifted through at least approximately 180° in relation to the phase of the RF interference signal and that is to be ascertained. The IQ mixer 124 then operates as a pure phase shifter for the local oscillator signal 102. Interference signal and suppression signal 122 have at least approximately the same frequency and the same amplitude superimposed on them upstream of the LNA input. The suppression phase canc_phi is then varied or altered, for example by means of gradient methods, until the frequency component 254 of the interference signal component in the mixer output signal becomes minimal (see FIG. 4). The interference signal can therefore be reduced or completely suppressed or rejected at RF level, upstream of the LNA, using the proposed design.

After the suppression phase has been adjusted, the first frequency offset, that is to say the frequency $f_{ofs,rxlo}$ of the first signal 104 (RXLO_BB), can be set to zero for a normal mode of the receiver 100. The suppression signal 122 with calibrated amplitude and phase then continues to be coupled into the received signal 128 via the coupler 130 in order to obliterate, reject or otherwise suppress the interference signal.

Figure 5:
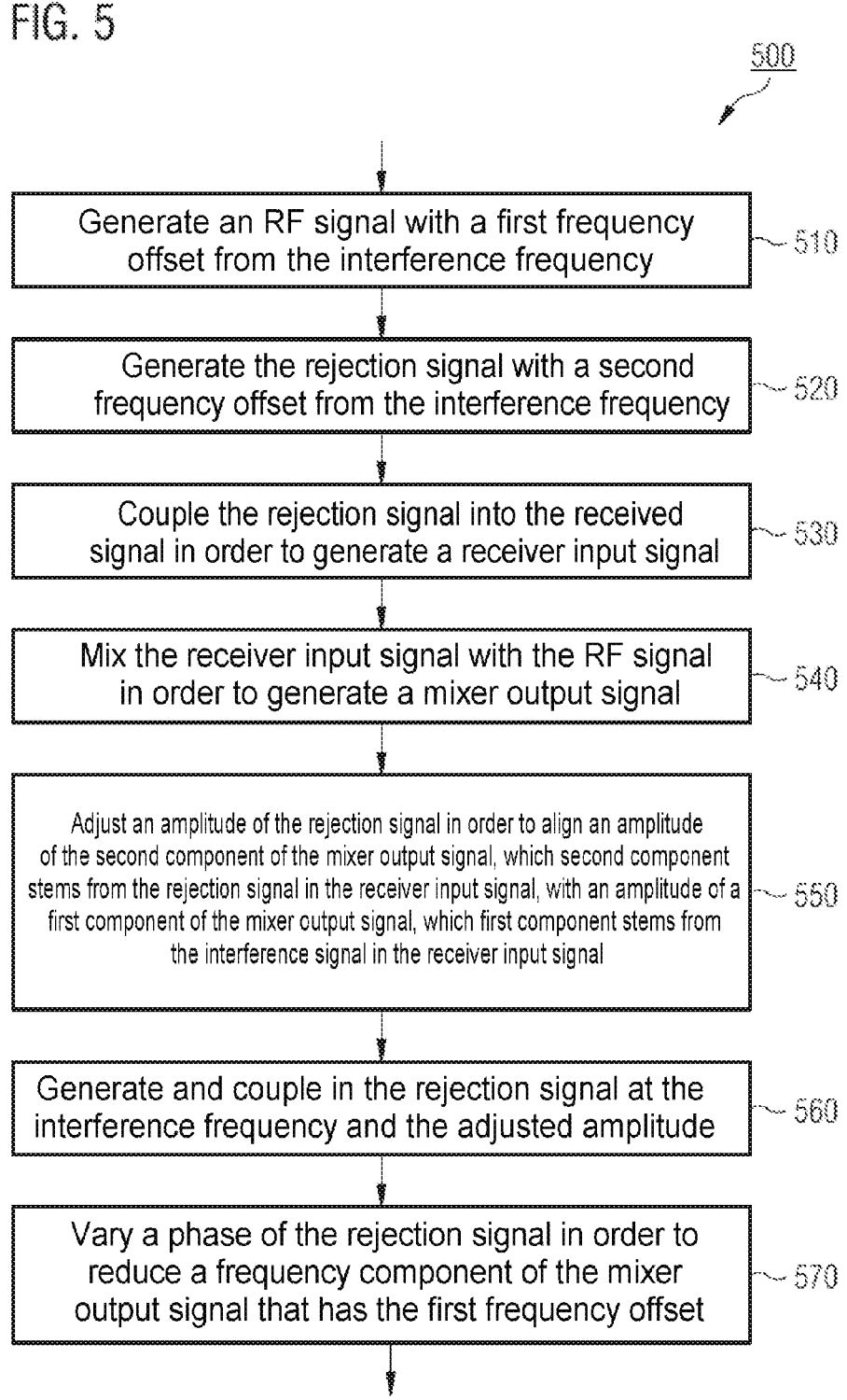
FIG. 5 shows a flowchart for a method for adjusting a rejection signal.

The design presented here is finally summarized once again on the basis of the flowchart of FIG. 5.

The method 500 shown therein for adjusting a suppression signal in a received signal comprises generating 510 an RF signal with a first frequency offset from the interference frequency, generating 520 the suppression signal with a second frequency offset from the interference frequency, coupling or injecting 530 the suppression signal into the received signal in order to generate a receiver input signal, mixing 540 the receiver input signal with the RF signal in order to generate a mixer output signal, adjusting 550 an amplitude of the suppression signal in order to align an amplitude of a second component of the mixer output signal, which second component originates from the suppression signal in the receiver input signal, with an amplitude of a first component of the mixer output signal, which first component originates from the interference signal in the receiver input signal, generating and coupling in (injecting) 560 the suppression signal at the interference frequency (that is to say without a frequency offset from the interference frequency) and the adjusted amplitude and varying 570 a phase of the suppression signal in order to reduce the amplitude of a frequency component of the mixer output signal that has the first frequency offset.

After the amplitude and phase of the suppression signal have been adjusted, the RF signal is generated in a "normal mode with suppression", not depicted explicitly in FIG. 5, without the first frequency offset from the interference frequency. The first frequency offset, that is to say the frequency $f_{ofs,rxlo}$ of the signal RXLO_BB, is thus set to zero for the normal mode of the receiver.

The aspects and features described together with one or more of the previously detailed examples and figures can also be combined with one or more of the other examples in order to replace an identical feature of the other example or in order to additionally introduce the feature into the other example.

Examples can furthermore be or relate to a computer program having a program code for carrying out one or more of the above methods when the computer program is executed on a computer or processor. Steps, operations or processes of different methods described above can be carried out by programmed computers or processors. Examples can also cover program storage devices, e.g. digital data storage media, which are machine-, processor- or computer-readable and encode machine-executable, processor-executable or computer-executable programs of instructions. The instructions carry out some or all of the steps of the methods described above or cause them to be carried out. The program storage devices can comprise or be e.g. digital memories, magnetic storage media such as for example magnetic disks and magnetic tapes, hard disk drives or optically readable digital data storage media. Further examples can also cover computers, processors or control units programmed to carry out the steps of the methods described above, or (field) programmable logic arrays ((F)PLAs or (field) programmable gate arrays ((F) PGAs) programmed to carry out the steps of the methods described above.

The description and drawings present only the principles of the disclosure. Furthermore, all examples mentioned here are intended to be used expressly only for illustrative purposes, in principle, in order to assist the reader in understanding the principles of the disclosure and the concepts contributed by the inventor(s) for further development of the art. All statements herein regarding principles, aspects and examples of the disclosure and also concrete examples thereof encompass the counterparts thereof.

A function block designated as "means for . . . " carrying out a specific function can relate to a circuit configured for carrying out a specific function. Consequently, a "means for something" can be implemented as a "means configured for or suitable for something" e.g. a component or a circuit configured for or suitable for the respective task.

Functions of different elements shown in the figures including those function blocks designated as "means", "means for providing a signal", "means for generating a signal", etc. can be implemented in the form of dedicated hardware, e.g. "a signal provider", "a signal processing unit", "a processor", "a controller" etc., and as hardware capable of executing software in conjunction with associated software. When provided by a processor, the functions can be provided by a single dedicated processor, by a single jointly used processor or by a plurality of individual processors, some or all of which can be used jointly. However, the term "processor" or "controller" is far from being limited to hardware capable exclusively of executing software, but rather can encompass digital signal processor hardware (DSP-hardware), network processor, application specific integrated circuit (ASIC), field programmable logic array (FPGA=Field Programmable Gate Array), read only memory (ROM) for storing software, random access memory (RAM) and nonvolatile memory device (storage). Other hardware, conventional and/or customized, can also be included.

A block diagram can depict for example a rough circuit diagram which implements the principles of the disclosure. In a similar manner, a flow diagram, a flowchart, a state transition diagram, a pseudo-code and the like can represent various processes, operations or steps which are represented for example substantially in a computer-readable medium and are thus performed by a computer or processor, regardless of whether such a computer or processor is explicitly shown. Methods disclosed in the description or in the patent claims can be implemented via a component having a means for performing each of the respective steps of said methods.

It goes without saying that the disclosure of multiple steps, processes, operations or functions disclosed in the description or the claims should not be interpreted as being in this specific order, unless this is explicitly or implicitly indicated otherwise, e.g. for technical reasons. The disclosure of a plurality of steps or functions therefore does not limit them to a specific order, unless said steps or functions are not interchangeable for technical reasons. Further, in some examples, an individual step, function, processes or operation can include multiple partial steps, functions, processes or operations and/or be subdivided into them. Such partial steps can be included and can be part of the disclosure of said individual step, provided that they are not explicitly excluded.

Furthermore, the claims that follow are hereby incorporated in the detailed description, where each claim can be representative of a separate example by itself. While each claim can be representative of a separate example by itself, it should be taken into consideration that—although a dependent claim can refer in the claims to a specific combination with one or more other claims—other examples can also encompass a combination of the dependent claim with the subject matter of any other dependent or independent claim. Such combinations are explicitly proposed here, provided that no indication is given that a specific combination is not intended. Further, features of a claim are also intended to be included for any other independent claim, even if this claim is not made directly dependent on the independent claim.

What is claimed is:

1. A method for adjusting a suppression signal for suppressing a radio frequency (RF) interference signal in a received signal, the RF interference signal having an interference frequency, the method comprising:
generating, by a first IQ mixer, an RF signal having a first frequency offset from the interference frequency;
generating, by a second IQ mixer, the suppression signal having a second frequency offset from the interference frequency;
coupling, by a coupler, the suppression signal into the received signal in order to generate a receiver input signal;
mixing, by a receiver circuit, the receiver input signal with the RF signal in order to generate a mixer output signal;
adjusting, by an amplitude compensator, an amplitude of the suppression signal in order to align an amplitude of a first component of the mixer output signal with an amplitude of a second component of the mixer output signal, wherein the first component originates from the suppression signal in the receiver input signal and the second component originates from the interference signal in the receiver input signal;
generating, by the second IQ mixer, an adjusted suppression signal having the interference frequency and the adjusted amplitude;
coupling, by the coupler, the adjusted suppression signal into the received signal; and
varying, by a phase compensator, a phase of the adjusted suppression signal in order to reduce a frequency component of the mixer output signal that has the first frequency offset.

2. The method as claimed in claim 1, wherein the RF signal is generated by the second IQ mixer by mixing a local oscillator signal and a first signal, wherein the first signal has a frequency corresponding to the first frequency offset.

3. The method as claimed in claim 1, wherein the suppression signal is generated by the second IQ mixer by mixing a local oscillator signal and a first signal, wherein the first signal has a frequency corresponding to the second frequency offset.

4. The method as claimed in claim 1, wherein generating the adjusted suppression signal comprises adjusting the amplitude of the suppression signal followed by setting the second frequency offset to zero.

5. The method as claimed in claim 1, wherein the suppression signal and the adjusted suppression signal are coupled into the received signal on a signal path between a receiving antenna and a low noise amplifier.

6. The method as claimed in claim 1, wherein the mixer output signal is spectrally decomposed.

7. The method as claimed in claim 6, wherein at least one of adjusting of the amplitude of the suppression signal or varying the phase of the adjusted suppression signal is performed based on the spectrally decomposed mixer output signal.

8. The method as claimed in claim 1, wherein the interference frequency corresponds to a frequency of a local oscillator signal that is used for a receiver and for a transmitter.

9. The method as claimed in claim 8, wherein the receiver and the transmitter are included in a radar transceiver.

10. The method as claimed in claim 1, wherein varying of the phase of the adjusted suppression signal comprises determining a phase for which the amplitude of the first component of the mixer output signal becomes minimal in comparison with other phases.

11. An apparatus for adjusting a suppression signal for suppressing a radio frequency (RF) interference signal in a received signal, wherein the RF interference signal has an interference frequency, comprising:
a first IQ mixer configured to generate an RF signal having a first frequency offset from the interference frequency;
a second IQ mixer configured to generate the suppression signal with a second frequency offset from the interference frequency;
a coupler configured to couple the suppression signal into the received signal in order to generate a receiver input signal;
a receiver circuit configured to mix the receiver input signal with the RF signal in order to generate a mixer output signal;
an amplitude compensator configured to adjust an amplitude of the suppression signal in order to align an amplitude of a first component of the mixer output signal with an amplitude of a second component of the mixer output signal, wherein the first component originates from the suppression signal in the receiver input signal and the second component originates from the interference signal in the receiver input signal,
wherein the second IQ mixer is configured to generate an adjusted suppression signal at the interference frequency and at the adjusted amplitude,
wherein the coupler is configured to couple the adjusted suppression signal into the received signal; and a phase compensator configured to vary a phase of the adjusted suppression signal in order to reduce the amplitude of the first component of the mixer output signal.

12. The apparatus as claimed in claim 11, wherein the second IQ mixer is configured to generate the adjusted suppression signal at the interference frequency by setting the second frequency offset of the suppression signal to zero.

13. The apparatus as claimed in claim 11, wherein the coupler is configured to couple the suppression signal and the adjusted suppression signal into the received signal on a signal path between a receiving antenna and a low noise amplifier.

14. The apparatus as claimed in claim 11, wherein the amplitude compensator is configured to spectrally decompose the mixer output signal, adjust at least one of the amplitude of the suppression signal or the phase of the adjusted suppression signal on a basis of the spectrally decomposed mixer output signal.

15. The apparatus as claimed in claim 11, wherein the first IQ mixer is configured to generate the RF signal by IQ-mixing a local oscillator signal and a first baseband signal having a frequency corresponding to the first frequency offset.

16. The apparatus as claimed in claim 11, wherein the second IQ mixer is configured to generate the suppression signal by IQ-mixing a local oscillator signal and a second baseband signal having a frequency corresponding to the second frequency offset.

17. A radar transceiver, comprising:
an apparatus for adjusting a suppression signal for suppressing a radio frequency (RF) interference signal in a received signal, wherein the RF interference signal has an interference frequency, the apparatus comprising:
a first IQ mixer configured to generate an RF signal having a first frequency offset from the interference frequency;
a second IQ mixer configured to generate the suppression signal with a second frequency offset from the interference frequency;
a coupler configured to couple the suppression signal into the received signal in order to generate a receiver input signal;
a receiver circuit configured to mix the receiver input signal with the RF signal in order to generate a mixer output signal;
an amplitude compensator configured to adjust an amplitude of the suppression signal in order to align an amplitude of a first component of the mixer output signal with an amplitude of a second component of the mixer output signal, wherein the first component originates from the suppression signal in the receiver input signal and the second component originates from the interference signal in the receiver input signal,
wherein the second IQ mixer is configured to generate an adjusted suppression signal at the interference frequency and at the adjusted amplitude,
wherein the coupler is configured to couple the adjusted suppression signal into the received signal; and
a phase compensator configured to vary a phase of the adjusted suppression signal in order to reduce the amplitude of the first component of the mixer output signal.

* * * * *